United States Patent [19]

Seibert et al.

[11] Patent Number: 4,776,645

[45] Date of Patent: Oct. 11, 1988

[54] SKID-CONTROLLED BRAKE SYSTEM

[75] Inventors: Wolfram Seibert, Pfungstadt; Norbert Ocvirk, Offenbach, both of Fed. Rep. of Germany

[73] Assignee: Alfred Teves GmbH, Frankfurt am Main, Fed. Rep. of Germany

[21] Appl. No.: 18,510

[22] Filed: Feb. 25, 1987

[30] Foreign Application Priority Data

Feb. 26, 1986 [DE] Fed. Rep. of Germany ....... 3606172

[51] Int. Cl.$^4$ .............................................. B60T 8/44
[52] U.S. Cl. .................................... 303/113; 303/116; 303/119
[58] Field of Search ......................... 303/113, 116, 119

[56] References Cited

U.S. PATENT DOCUMENTS

| 4,523,792 | 6/1985 | Belart et al. | 303/119 X |
| 4,555,144 | 11/1985 | Belart et al. | 303/119 X |
| 4,681,375 | 7/1987 | Belart | 303/119 X |

FOREIGN PATENT DOCUMENTS

| 3324496 | 1/1985 | Fed. Rep. of Germany | 303/116 |
| 2178499 | 2/1984 | United Kingdom | 303/116 |
| 2169975 | 7/1986 | United Kingdom | 303/116 |
| 2173559 | 10/1986 | United Kingdom | 303/116 |

Primary Examiner—Duane A. Reger
Assistant Examiner—Matthew C. Graham
Attorney, Agent, or Firm—James B. Raden; Robert P. Seitter

[57] ABSTRACT

A skid-controlled brake system comprising a pedal-operated vacuum booster (3) including a master cylinder (2) connected by way of brake lines (63, 64) to the wheel brakes (31, 32, 33, 34). The system further comprising a hydraulic auxiliary pressure supply system connected, by way of supply lines (24) to the brake circuits and including a hydraulic pump (26). A pressure compensation and pressure fluid reservoir (20) is provided. Wheel sensors ($S_1$, $S_2$, $S_3$, $S_4$) and electronic switching circuits (44) are provided for detecting the wheel rotating pattern and for generating electric brake pressure control signals to control, for skid control, an electromagnetically operable 3-way/2-position valve inserted into each brake line (63, 64). Control valves (10, 11) are disposed in the piston (6, 7) of the master cylinder (2) opening the pressure fluid passage from the pressure chambers (8, 9) of the master cylinder (2) to the annular chambers (14, 15) formed by circular grooves (54, 55) in the pistons (6, 7) and by the piston bore (65). The control valves (10, 11) are in communication, by way of compensating ports (16, 17) and hydraulic lines (18, 19), with the pressure fluid reservoir (20).

7 Claims, 1 Drawing Sheet

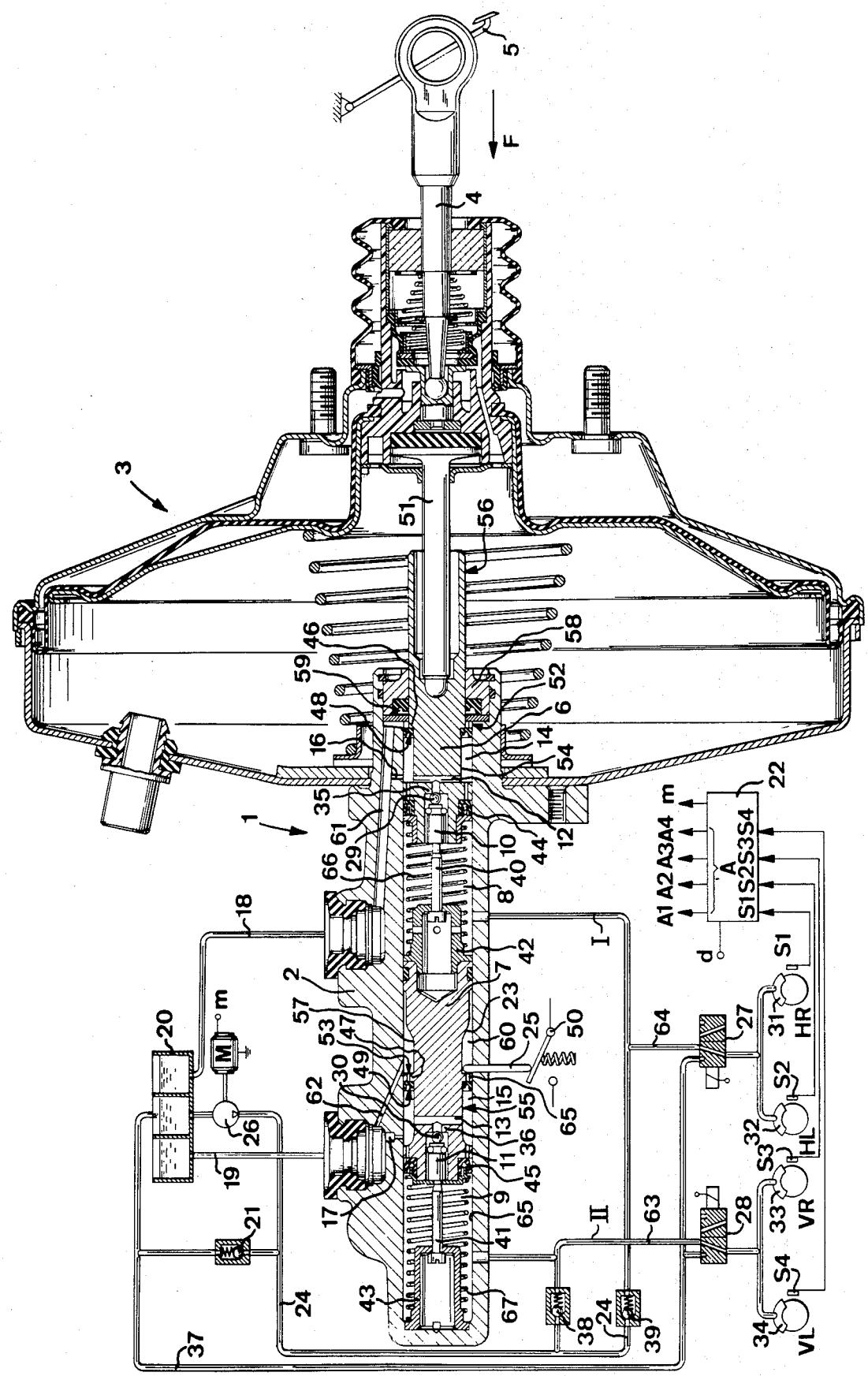

4,776,645

SKID-CONTROLLED BRAKE SYSTEM

BACKGROUND OF THE INVENTION

The present invention relates to a skid-controlled brake system comprising a pedal-operated vacuum booster including a master cylinder to which are connected by way of pressure fluid conduits, the wheel brakes. The system further comprising a hydraulic auxiliary pressure supply system including a hydraulic pump, a pressure compensation and pressure fluid reservoir. The system further comprising wheel sensors and electronic switching circuits for detecting the wheel rotating pattern and for generating electrical brake pressure control signals to control electromagnetically operable valves for skid control.

In a brake system of this type (Patent Application No. P No. 35 02 451.8) first directional valves are provided in the brake lines interconnecting the brake chambers of the master cylinder and the wheel brakes. Through the valves, the wheel brakes can be hydraulically separated from the pressure chambers. A pressure fluid connection is established, by way of second directional valves provided in the brake lines between the return and the wheel brakes. Moreover, an auxiliary pressure control valve is inserted in the pressure line leading from the pump of the auxiliary pressure means to the brake circuits. The control input of said auxiliary pressure control valve is connected to a pressure chamber of the master cylinder so that upon commencement of the skid control and upon actuation of the pump, respectively, an auxiliary pressure proportional to the pedal force can develop. Finally, a special differential pressure detector is provided detecting the side of which the pressure is higher as a result of a defective condition, hence, indicating the type of error therefrom.

It is, therefore, an object of the present invention to substantially simplify a brake system of the type under consideration and, in particular, to reduce the number of its valves without affecting operation of the brake system.

SUMMARY OF THE INVENTION

In the practice of the present invention, this object is achieved wherein a directional valve having two switching positions is connected into the pressure fluid path leading from the master cylinder to the wheel brakes, through which valve the pressure fluid connection between master cylinder and wheel brake can be discontinued and connected to a return line. The master cylinder includes at least one valve which, during inflow of pressure fluid from the auxiliary pressure source into the pressure chamber of the master cylinder in communication with the auxiliary pressure source by way of a supply line, permits an off-flow of the pressure fluid from the pressure chamber into the pressure fluid reservoir, when the piston of the master cylinder takes a predetermined position.

Preferably, the valve for regulating the pressure in the pressure chamber of the master cylinder is disposed in the master cylinder piston and, by way of a connecting member such as a connecting screw pivoted to a stationary stop is actuable in the opening sense.

The directional valve is electromagnetically drivable, with the connecting line containing a check valve, of the auxiliary pressure source, respectively, terminating in the pressure fluid path leading from the pressure chamber of the master cylinder to the directional valve.

Preferably, the master cylinder piston, at the cylindrical surface thereof, includes a recess or circular groove which, along with the piston bore of the master cylinder, forms an annular chamber, with a sealing element such as a sealing sleeve, being supported on the shoulder or flange confining the annular chamber at the pedal side, with the sealing sleeve cooperating with a compensating port in the wall of the master cylinder.

A channel disposed in the piston terminates in the recess or circular groove forming an annular chamber with the piston bore and provided on the piston. The channel is in communication with the pressure chamber ahead of the piston and is closeable by a valve. The valve member is held by a tension element, for example, a connecting screw which, in turn, cooperates with a stationary stop, for example, a stop sleeve.

In order to ensure deceleration in the event of a failure of the valve for regulating the pressure in the pressure chamber, the piston, at the end thereof facing the brake pedal, includes a step of smaller diameter forming with the piston bore or stop ring disposed in the master cylinder. A second annular chamber which, by way of an intake channel and/or a hydraulic line, is in communication with the fluid pressure reservoir.

BRIEF DESCRIPTION OF THE DRAWING

Further objects and advantages of the present invention will be apparent from the following description of one embodiment with reference to the drawing in which the single figure, in simplified illustration, shows, partly in section and partly in schematical form, the components of a skid-controlled brake system of the invention.

DETAILED DESCRIPTION

In the embodiment illustrated, the brake system according to the present invention comprises a hydraulic combination to form the brake pressure generator 1 comprising a tandem master cylinder 2 and a vacuum booster 3 coupled thereto. The pedal force F exerted in known manner by way of a push rod 4 on a brake pedal 5 is transferred to the vacuum booster 3 from where, supported by the auxiliary force, it is transferred to the working pistons 6 and 7 of the tandem master cylinder 2.

In the released position of the brake as shown in the drawing, the pressure chambers 8, 9 of the master cylinder, are connected to a pressure compensating and pressure fluid reservoir 20 by way of open control or central valves 10, 11, by way of connecting channels 12, 13 in the interior of the pistons 6, 7 and, finally, by way of annular chambers 14, 15, by way of compensating or connecting ports 16, 17 and by way of hydraulic lines 18, 19.

The intake side of the pump 26 is in communication with the reservoir 20. The pump is a hydraulic pump driven by electromotive force (motor M). The electrical connections such as "m" are symbolized.

The two brake circuits I, II of the master cylinder 2, by way of electromagnetically operable valves 27, 28, which, in non-pressurized condition, are switched to the passage position, respectively, are connected to two wheel brakes 31, 32; 33, 34. The wheel brakes 31, 32 and 33, 34, which respectively are connected in parallel, can be respectively associated, as in the present instance, to the wheels of one axle (rear wheels HR, HL; front wheels VR, VL) or to a diagonal pair thereof.

The wheel brakes are connected to electromagnetically operable valves 35, 36 which, moreover, are in communication with the pressure compensating reservoir 20 by way of a hydraulic return line 37.

The brake circuits I, II, respectively by way of a check valve 38, 39 and by way of a connecting line 24, are connected to the auxiliary pressure supply system or the hydraulic pump 26, respectively, and to the pressure relief valve 21. The check valves 38, 39 will open as soon as the auxiliary pressure (pump pressure) rises by a predetermined minimum value beyond the pressure momentarily applied to the brake circuits I, II between the valves 27, 28.

The vehicle wheels are equipped with inductive sensors $S_1$ to $S_4$ cooperating with a crown wheel engaged in synchronism with the wheel rotation and generating electrical signals detecting the wheel rotational pattern, that is, the wheel speeds and changes. These signals, are supplied by way of inputs $S_1$ to $S_4$ to an electronic signal processing and combinational circuit 22 generating brake pressure control signals by way of which, upon detection of a clocking tendency, valves 27, 28 are temporarily reswitched to thereby keep the brake pressure constant, decrease and re-increase it thereafter. The actuating magnets of the inlet and outlet valves are driven by way of outputs $A_1$ to $A_4$. The electrical connecting lines between the connections $A_1$ to $A_4$ and the windings of the valve, for the sake of simplicity, have not been shown.

Circuit 22 can be realized in known manner by hardware-implemented circuits or programmable electronic modules, such as microcomputers or microcontrollers.

The switch-on signal for starting the driving motor of the hydraulic pump 26 running only during a skid control is applied to motor M by way of connection m.

The operation of the brake system is as follows: When applying the brakes, the pedal force F, supported by the vacuum in the booster 3, is transferred from the actuating rod 51 to the master cylinder piston 6, 7. The control or central valves 10, 11 will close so as to enable brake pressure to be built up in the brake chambers 8, 9 and hence in circuits I, II which, by way of valves 27, 28, is fed to the wheel brakes 31, 32 and 33, 34, respectively.

If a locking tendency is detected by sensors $S_1$ to $S_4$ and circuit 44 on one or several of the wheels, the skid control will commence. Driving motor M of pump 26 turns on so that an auxiliary pressure can now develop in the auxiliary pressure supply system and on supply line 24.

The auxiliary pressure is fed by way of the supply line 24 to the brake circuits I and II, with a corresponding pressure build up in the pressure chambers 8, 9 which then causes the pistons 7, 8 to be pushed back (in a direction opposite the arrow direction F) until the central valves 10, 11 finally open as the valve members 29, 30 fixed by way of connecting screws 40, 41 to the stop sleeves 42, 43, are removed from the valve seats 35, 36 of pistons 6, 7. This enables the pressure fluid to discharge into the reservoir 20 by way of connecting channels 12, 13; annular chambers 14, 15; and hydraulic lines 18, 19.

In addition to the sealing sleeves 44, 45 facing the pressure chambers 8, 9 each of the two pistons 6, 7 comprises a flange portion 46, 47 each having one sealing sleeve 48, 49 and including filling ports 52, 53. The second sealing sleeves 48, 49 disposed behind the first sealing sleeve 44 and 45, respectively, ensure that leakage of the respectively front-sided sealing sleeve does not result in a failure of the corresponding pressure chamber 8 and 9. The rear-sided sealing sleeve 48 and 49, respectively, in such cases sweep over the connecting port 16 and 17 and solely by the force on the actuating rod 51 develops a brake pressure in the corresponding working chamber 8 and 9, respectively. A leaky front-sided sleeve 44 and 45, respectively, also results in that the pistons 6, 7 continue to be pushed into the master cylinder 2 in the arrow direction F thereby causing the scanner 25 to close the contact of the switch 50 turning off the auxiliary pressure supply means 26, 21 by way of circuit 22. As a consequence of such a "dropping through" of pistons 6, 7 a deceleration thereafter can only take place with no skid control. For this purpose, valves 27, 28 take the switching positions as shown in the drawing.

Of particular advantage are the low-cost and safe valves 27, 28 in the form of 3-way/2-position valves which regulate the pressure in the wheel brakes. Similarly, the dual function of the central valves 10, 11 provides advantages in that on the one hand, they replace a costly device for controlling the pressure of the auxiliary pressure source and, on the other hand, they enable the pressure to be exclusively built up by way of displacement of the actuating rod 51.

What is claimed is:

1. A skid-controlled brake system for automotive vehicles comprising a pedal operated vacuum booster including a master cylinder having a piston (6, 7) therein and being connected to the wheel brakes by way of pressure fluid conduits, further comprising a hydraulic auxiliary pressure supply system including a hydraulic pump connected into said fluid conduits and the pressure chamber (8, 9) of the master cylinder by way of a supply conduit (24), a pressure compensation and pressure fluid reservoir, and comprising wheel sensors and electronic switching circuits for detecting the wheel rotating pattern and for generating electrical brake pressure control signals to control electromagnetically operable valves inserted into the pressure fluid conduits for skid control, wherein a directional valve (27, 28) having two switching positions is inserted into the pressure fluid path leading from the master cylinder (2) to the wheel brakes (31 to 34), which directional valve can discontinue the pressure fluid connection between said master cylinder (2) and said wheel brakes (31, 32, 33, 34 respectively) and to couple said wheel brakes to a return conduit (37) connected to said reservoir, wherein the master cylinder (2) includes at least one valve (10, 11) therein connected between the pressure chamber (8, 9) of the master cylinder and said reservoir which opens to permit an off-flow of the pressure fluid reservoir (20) during in-flow of pressure fluid from the auxiliary pressure source (21, 26) into the pressure chamber (8, 9) of the master cylinder (2) when the piston (6, 7) of the master cylinder (2) is in a predetermined position corresponding to a locking tendency detected by said sensors wherein the piston (6, 7) of the master cylinder is returned in a direction opposite to the pedal-operated travel thereof.

2. A brake system according to claim 1, wherein the valve (10, 11) for regulating the pressure in the pressure chamber (8, 9) of the master cylinder (2) is disposed in the master cylinder piston (6, 7) and, by way of a connecting member pivoted to a stationary stop connecting screw (40, 41), is operable in the opening sense.

3. A brake system according to claim 1, wherein the directional valve (27, 28) connected into the brake conduit (63, 64) is electromagnetically drivable, with a connecting line (24) of the auxiliary pressure source (26, 21) is provided, said connecting line (24) including a check valve and said connecting line (24) terminating in the pressure fluid path leading from the pressure chamber (8, 9) of the master cylinder (2) to the directional valve (27, 28).

4. A brake system according to claim 3, wherein the master cylinder piston (6, 7) at the cylindrical surface thereof, comprises a recessed, circular groove (54, 55) which along with the piston bore (55) of the master cylinder (2) forms an annular chamber (14, 15) with a sealing sleeve (48, 49) supported on a flange (46, 47) confining the annular chamber (14, 15) at the pedal side, said sealing sleeve cooperating with a compensating bore (16, 17) in the wall of the master cylinder (2).

5. A brake system according to claim 4, wherein a passageway (12, 13) provided in said piston (6, 7) terminates in the recessed circular groove (54, 55) provided on the master cylinder piston (6, 7) and forms an annular chamber (14, 15) with the piston bore (55), which passageway is in communication with the pressure chamber (8, 9) ahead of the piston 6, 7) and which is closeable by a valve (10, 11) a valve member (29, 30) of which is held by a connecting screw (40, 41) which, in turn, cooperates with a stop sleeve (42, 43) supported, by way of a compression spring (66, 67) on piston (6, 7).

6. A brake system according to claim 5, wherein the piston (6, 7) at the end thereof facing the brake pedal (5), comprises a step of smaller diameter (56, 57) which, along with at least one of the piston bore (55) and a stop ring (58) disposed in the master cylinder (2) forms a second annular chamber (59, 60) in communication, by way of intake channel (61, 62) hydraulic conduit (18, 19) with the pressure fluid reservoir (20).

7. A brake system according to claim 6, wherein the step of smaller diameter (57) of piston (7) comprises a mounting ramp (23) cooperating with a scanner (25) of an electrical switch (50) connected into the electronic circuit.

* * * * *